United States Patent Office 3,250,269
Patented May 10, 1966

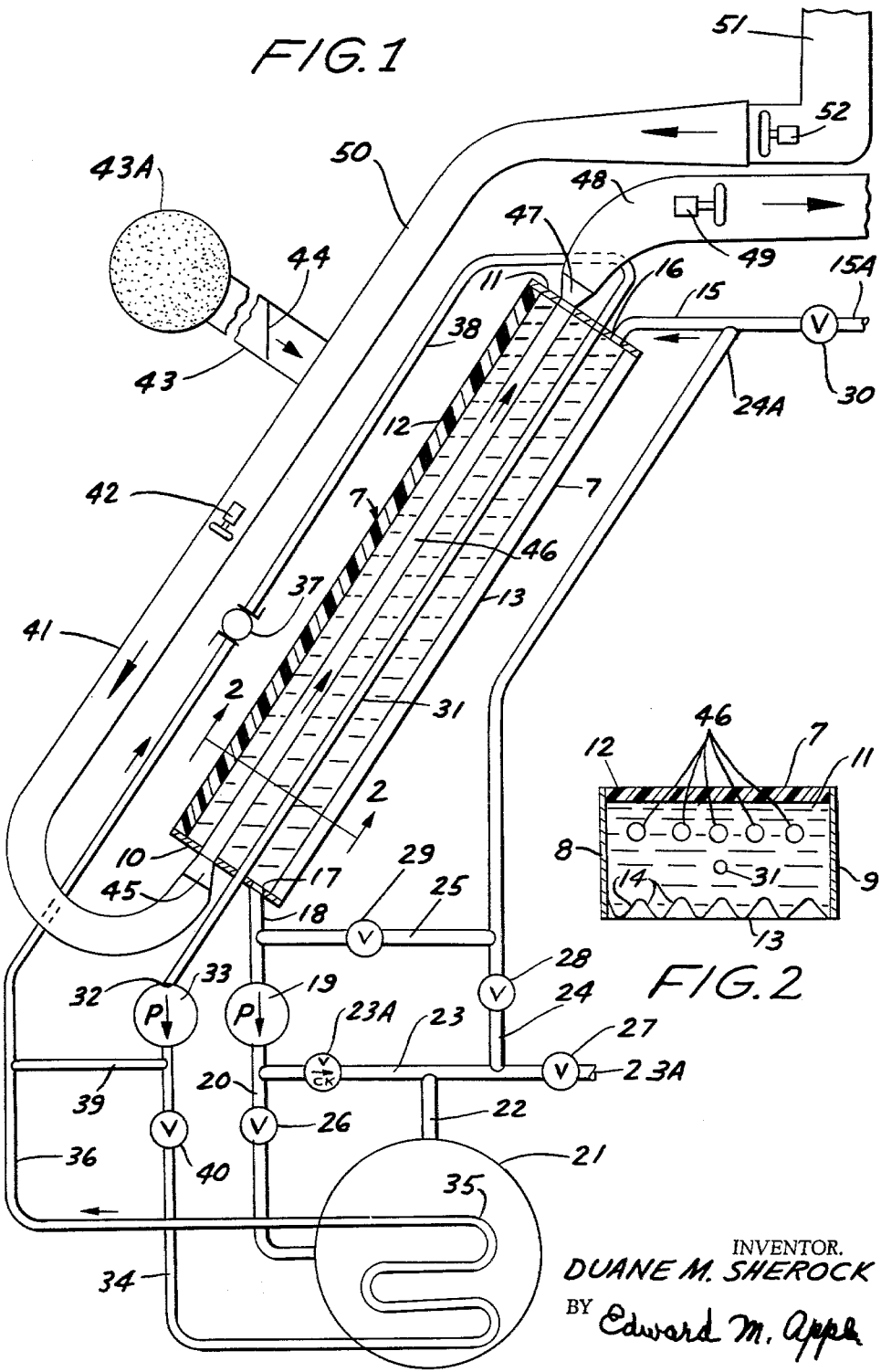

3,250,269
SOLAR HEAT DEVICE
Duane M. Sherock, 32190 Five Mile Road,
Livonia, Mich.
Filed June 3, 1965, Ser. No. 461,132
7 Claims. (Cl. 126—271)

This invention relates to solar heat devices and has particular reference to a solar heat system suitable for heating the interior of a building.

Another object of the invention is to provide a device of the character indicated which is constructed and arranged to utilize solar radiation for heating the interior of a building, with means for storing the heat when not called for and means for providing delayed heat exchange.

Another object of the invention is to provide a solar heat exchange system which employs both air and a liquid in the heat exchange cycles.

Another object of the invention is to provide a solar heat exchange system which employs both air and a liquid in the heat exchange cycles with storage means for delayed action in the heat exchange during certain phases thereof.

Another object of the invention is to generally improve solar heating devices, and to provide a device of that character which is simple in construction, economical to manufacture and efficient in operation.

The foregoing and other objects and advantages of the invention will become more apparent as the description proceeds, reference being made from time to time to the accompanying drawing, forming part of the within disclosure, in which drawing:

FIG. 1 is a schematic view, with parts in section, of a device embodying the invention.

FIG. 2 is a section taken substantially on the line 2—2 of FIG. 1.

Referring now more particularly to the drawings, it will be understood that in the embodiment herein disclosed, the reference character 7 indicates in general a substantially rectangular housing, which is provided with side walls 8 and 9 (FIG. 2), end walls 10 and 11 (FIG. 1), and a top wall 12, which is preferably made of glass, or a suitable plastic material, and a bottom wall 13 which has an undulating cross section, as shown in FIG. 2, and is made of a highly reflective material to provide a plurality of reflective surfaces 14, which are arranged to reflect the sun's rays in a number of directions on the interior of the receptacle 7. The bottom surface of the wall 13 is preferably painted black.

The members 8, 9, 10, 11, 12 and 13, are secured together by any suitable means to provide an airtight receptacle 7.

The receptacle 7 is positioned in a suitable opening in the roof of the building (not shown) intended to be heated, so that the rays of the sun, as long as it is shining, may strike and pass through the wall 12, and be reflected back into the receptacle 7 by the wall 13, whereby to heat the interior of the receptacle 7 and a suitable liquid, preferably having a low boiling point, with which the receptacle 7 is filled.

The liquid is supplied to the interior of the receptacle 7 through the liquid intake pipe 15, which extends through a sealed opening 16 formed in the end wall 11.

The liquid is withdrawn from the receptacle 7 through a sealed opening 17, formed in the end wall 10, which opening communicates with the pipe 18, which comprises part of one of the liquid circuits hereinafter described.

A pump 19 circulates the liquid through the receptacle 7, the pipes 18 and 20, the latter being connected to a liquid storage container 21. The liquid flows from the liquid storage container 21 through the pipe 22, and into the pipes 23 and 24, the latter connecting to the pipe 15 as at 24A. The pipes 18 and 24 are connected by a pipe 25.

The pipe 23 is provided with a check valve 23A so that the liquid may flow in only one direction in the pipe 23.

The pipes 15, 20, 23, 24 and 25 are provided with solenoid valves, respectively indicated by the reference characters 26, 27, 28, 29 and 30, in order to control the flow of liquid therein as hereinafter described. The ends 15A and 23A of the pipes 15 and 23 are connected to suitable radiators (not shown) which are located in the area to be heated.

The elements 15–30 are all located in the primary liquid circuit which is employed in the device.

I also provide a secondary liquid circuit which I will now describe.

The secondary liquid circuit consists of a pipe 31 which extends through the interior of the housing 7, and is surrounded by the liquid in the housing 7 and in the primary liquid circuit. The pipe 31 passes through the ends 10 and 11 of the receptacle 7 and is sealed so that none of the liquid in the receptacle 7 may leak around the pipe 31.

The pipe 31 connects as at 32 to a pump 33, which pump 33 is connected to a line 34, which in turn connects to a coil 35 positioned in the liquid storage container 21.

The coil 35 is connected at its opposite end with a pipe 36, which is connected at one side to a generator 37. The opposite side of the generator 37 is connected to a pipe 38, which in turn is connected to the pipe 31 to complete the secondary liquid circuit.

By-pass line 39 connects between the pipes 34 and 36 and is controlled by means of a solenoid valve 40.

In addition to the two liquid circuits which I have described, the device is also provided with an air circuit which consists of the main conduit 41 in which is positioned a fan 42, and which communicates with a stack 43, open to atmosphere, which stack 43 is provided with a damper 44. The stack 43 is intended to supply the conduit 41 with fresh air as occasion demands. The air entering the stack 43 is pre-heated as it passes through a perforated dome 43A, which is made of a heat collecting material and is positioned to receive the direct rays of the sun.

The lower end of the conduit 41 connects to a header 45, which is secured to the end 10 of the receptacle 7. The header 45 is sealed so that there is no leakage around the same.

The header 45 communicates with a plurality of tubes 46, which extend through the interior of the housing 7 (FIG. 2). The tubes 46 are surrounded by the liquid in the receptacle 7 and receive the sun's rays, passing through the wall 12 and reflected from the wall 13.

The opposite ends of the tubes 46 are connected to a similar header 47, which is secured to the end wall 11 of the receptacle 7, and is sealed therefrom as previously described.

The header 47 is connected to an air conduit 48, which in turn connects with suitable hot air registers (not shown) provided in the area to be heated. The hot air conduit 48 is provided with a fan, or blower, 49 to help move the air.

The conduit 41 beyond the stack 43 connects to a conduit 50, which in turn connects to a cold air duct 51, which picks up the cold air from the area being heated. The cold air duct 51 may or may not be provided with a fan 52 to help move the air.

The device functions as follows. The primary and secondary liquid circuits are first charged with a suitable liquid after the receptacle is positioned and hooked up as previously described. Rays from the sun pass through the wall 12 and are reflected back by the wall 13, causing the temperature of the liquid in the liquid circuits to rise. At the same time, air passing through the conduit 41 and pipes 46 is likewise heated. The fluid in the primary circuit picks up the heat and carries it to the radiators positioned in the area to be heated. When sufficient heat is provided in the area to be heated, the solenoid valves 27 and 30 are closed so that the heated liquid remains in the closed circuit through the liquid storage container 21 where the heat may be stored until called for.

With the proper control of the solenoid valves 26, 28 and 29 the liquid may be circulated through the short circuits provided by the pipes 23 and 25 until the liquid is exceedingly warm, at which time it may then be diverted into the liquid storage container 21.

It will be understood that the liquid storage container 21 is properly insulated to retain the heat therein.

When the sun goes down and the temperature falls in the area to be heated, the solenoid valves will then open to permit the circuit to be completed through the container 21, so that the heat stored therein may be utilized in the area to be heated.

The secondary liquid circuit through the pipes 31, 34, 36 is used to heat the coil 35 which in turn helps to heat the liquid in the liquid storage receptacle 21. The coil 35 may be by-passed through the pipe 39 by closing the valve 40 so that the full flow of the liquid through the secondary circuit and its heat exchange potential may be employed to operate the generator 37.

From the foregoing it will be seen that I have disclosed a solar heat exchange device which employs several liquid circuits as well as an air circuit.

Having described my invention, what I claim and desire to secure by Letters Patent is:

1. In a solar heat exchange system the combination of a receptacle having at least one transparent wall, exposed to the rays of the sun, a liquid in said receptacle, a liquid storage container, pipe means defining a first liquid circuit in communication with the interiors of said receptacle and said container, extensions on said pipe means for connecting to area heating devices, and means to control the flow of liquid in said first circuit, a second liquid circuit including pipe means extending through said receptacle and connecting to a coil positioned in said storage container, and means to control the flow of liquid in said second circuit, and an air circuit comprising air conduit means having a portion thereof extending through said receptacle and having its ends terminating in areas to be heated, and means to control the flow of air in said air conduit means.

2. The structure of claim 1, in which said air conduit means has a fresh air intake element, with means to preheat the air entering said intake element.

3. The structure of claim 1, in which that portion of the air conduit means which extends through the said receptacle is constructed and arranged to give maximum surface area exposure to the sun.

4. The structure of claim 1, in which said first named receptacle has at least one corrugated wall of highly reflective material.

5. The structure of claim 1, in which each said liquid circuit and said air circuit has means therein to propel the medium therein 6. The structure of claim 1, in which each said liquid circuit is provided with means to by pass said liquid storage container.

7. The structure of claim 1, in which said second liquid circuit has power means therein for driving a generator.

References Cited by the Examiner
UNITED STATES PATENTS

| | | | |
|---|---|---|---|
| 761,596 | 5/1904 | Moss | 126—271 |
| 1,101,000 | 6/1914 | Willsie | 126—271 X |
| 1,217,165 | 2/1917 | Fessenden | 126—271 X |
| 2,969,637 | 1/1961 | Rowekamp | 126—271 X |

CHARLES J. MYHRE, *Primary Examiner.*